United States Patent
Aguiar

(10) Patent No.: US 10,450,222 B2
(45) Date of Patent: Oct. 22, 2019

(54) METHOD FOR FORMING A LAYER OF COLOURED GLASS ON A GLASS SUBSTRATE BY FLAME PYROLYSIS

(71) Applicant: SAINT-GOBAIN GLASS FRANCE, Courbevoie (FR)

(72) Inventor: Rosiana Aguiar, Paris (FR)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 0 days.

(21) Appl. No.: 15/023,261

(22) PCT Filed: Oct. 8, 2014

(86) PCT No.: PCT/FR2014/052550
§ 371 (c)(1),
(2) Date: Mar. 18, 2016

(87) PCT Pub. No.: WO2015/052436
PCT Pub. Date: Apr. 16, 2015

(65) Prior Publication Data
US 2016/0236976 A1 Aug. 18, 2016

(30) Foreign Application Priority Data
Oct. 9, 2013 (FR) .................... 13 59789

(51) Int. Cl.
| C03C 17/02 | (2006.01) |
| C03C 1/00 | (2006.01) |
| C03C 3/078 | (2006.01) |
| C03C 3/089 | (2006.01) |
| C03C 4/02 | (2006.01) |

(52) U.S. Cl.
CPC ............ C03C 17/02 (2013.01); C03C 1/008 (2013.01); C03C 3/078 (2013.01); C03C 3/089 (2013.01); C03C 4/02 (2013.01); C03C 2217/72 (2013.01); C03C 2218/15 (2013.01)

(58) Field of Classification Search
CPC ... C04B 41/009; C04B 41/52; C04B 41/5022; C04B 41/89; C04B 41/4533; C04B 41/4549; C03C 17/001
See application file for complete search history.

(56) References Cited

U.S. PATENT DOCUMENTS

| 5,652,021 A | 7/1997 | Hunt et al. |
| 2001/0024685 A1* | 9/2001 | Boulton ................. C03C 17/02 427/162 |
| 2009/0104369 A1 | 4/2009 | Rajala et al. |
| 2009/0274930 A1* | 11/2009 | Remington, Jr. ..... C03C 17/002 428/689 |
| 2010/0047554 A1 | 2/2010 | Rajala et al. |
| 2010/0330377 A1* | 12/2010 | Ilmarinen ............ B05B 7/0441 65/60.1 |

OTHER PUBLICATIONS

Handbook of Optical Constants of Solids (Year: 1997).*
International Search Report as issued in International Patent Application No. PCT/FR2014/052550, dated Dec. 23, 2014.
Brunner, T. J., et al., "Glass and bioglass nanopowders by flame synthesis," Chemical Communications, The Royal Society of Chemistry, vol. 13, Jan. 2006, pp. 1384-1386.
Gross, K. A., et al., "Liquid Flame Spraying for Glass Coloring," Journal of Thermal Spray Technology, vol. 8(4), Dec. 1999, pp. 583-589.
Teoh, W. Y., et al., "Flame spray pyrolysis: An enabling technology for nanoparticles design and fabrication," Nanoscale, vol. 2, No. 8, Jan. 2010, pp. 1324-1347.

* cited by examiner

*Primary Examiner* — Joseph S Del Sole
*Assistant Examiner* — Mohamed K Ahmed Ali
(74) *Attorney, Agent, or Firm* — Pillsbury Winthrop Shaw Pittman LLP

(57) ABSTRACT

A process includes the formation of a colored glass layer on a glass substrate by flame pyrolysis of a solution including at least one precursor of a cobalt, iron, manganese, chromium, silver, copper, gold or selenium oxide, alone or as a mixture of several of them. Moreover, a glass substrate is coated with a layer of colored glass obtained by such a process.

8 Claims, No Drawings

METHOD FOR FORMING A LAYER OF COLOURED GLASS ON A GLASS SUBSTRATE BY FLAME PYROLYSIS

CROSS-REFERENCE TO RELATED APPLICATIONS

This application is the U.S. National Stage of PCT/FR2014/052550, filed Oct. 8, 2014, which in turn claims priority to French Application No. 1359789, filed Oct. 9, 2013. The contents of all of these applications are incorporated herein by reference in their entirety.

The invention relates to the production of articles made of colored glass.

The color of a glass is given to it by its composition.

Thus, when it is desired to change from the production of colorless glass to the production of colored glass or from the production of colored glass to the production of glass of another color, it is possible first of all to think of changing the composition of the starting materials on one and the same plant. However, the glass obtained in the transitional phase, before stabilization of the new color desired, is obtained in a large amount and has to be discarded.

On the other hand, colored glass can be obtained via thin layers, such as formed by cathode sputtering, in particular magnetron cathode sputtering. However, the color is obtained by interference and thus can only be obtained on one side: either in transmission or in reflection, but not both.

Another route consists in forming a colored coating by the sol-gel process. For example, a glass substrate can be printed by means of a sol-gel solution using silk screen printing or another technique. The sol-gel coating has to be dried and cured in order to exhibit the color and the mechanical strength desired. This process is relatively lengthy and can only be carried out outside the production line.

The invention has had the objective of obtaining colored glass in a simple and practical way, not requiring in particular the modification of the composition of starting materials of a glass substrate, relatively short in time and being able to be carried out on the line for the production of the glass substrate.

This objective is achieved by the invention which consequently has as subject matter a process for the formation of a colored glass layer on a glass substrate by flame pyrolysis of a solution comprising at least one precursor of a cobalt, iron, manganese, chromium, silver, copper, gold or selenium oxide, alone or as a mixture of several of them.

The color of the glass thus coated is visible in transmission and in reflection. Flame pyrolysis requires a simple plant which can be easily incorporated on a float glass line, for example.

Varied colors can be obtained in this way: blue with a cobalt or manganese oxide, yellow with a chromium or silver oxide, red with a copper oxide, purple with a manganese oxide, pink and ruby red with a gold oxide, orangey yellow to red with a selenium oxide. It is possible, by varying the composition of metal oxides, to obtain colors such as green, gray and brown, and each color in varied shades.

According to other preferred characteristics of the process of the invention:
  precursors in solution are introduced into and then decomposed in a burner to give glass nanoparticles which are deposited on said glass substrate at a temperature between ambient temperature and 600° C.;
  said precursors consist of organometallic compounds and/or salts;
  said precursors are soluble in alcoholic solution;
  the distance from the burner to the glass substrate is at most equal to 10 mm, preferably to 8 mm and particularly preferably to 6 mm; there is thus obtained a layer of colored glass which is dense, as can be characterized with a scanning electron microscope; the further the burner from the substrate, the larger the particles deposited, the layer formed becomes porous until existing in the form of a powder no longer constituting a layer. The distance from the burner to the glass substrate is at least equal to 2 mm.

Another subject matter of the invention is a glass substrate coated with a layer of colored glass obtained by a process as described above, characterized in that the thickness of the layer of colored glass is between 50 and 10 000 nm.

The invention is now illustrated by the following examples.

EXAMPLE 1

A 1% by weight cobalt acetylacetonate solution is prepared which has the following composition (amounts shown in grams):

| | |
|---|---|
| Absolute ethanol | 480 (g) |
| Tetraethoxysilane (TEOS) | 65 |
| Aluminum tri(sec-butoxide) | 10 |
| Triethoxyborane | 55 |
| Magnesium methoxyethoxide | 5 |
| Calcium methoxyethoxide | 8 |
| Potassium t-butoxide | 3 |
| Cobalt acetylacetonate | 1.5 |
| Hydrochloric acid | 2 |

A layer of blue glass is formed by flame pyrolysis on a 10 cm×10 cm sample of soda-lime glass. The above solution is sprayed onto the sample in the flame with the orifice of a burner in the form of a slit with a length of 20 cm.

The flow rates employed in the burner are:
2 ml/min of the above solution,
160 l/min of air and
8 l/min of propane.

The burner is moved above the glass sample at an unchanging distance of 5 mm and at a speed of 3 m/min.

The glass sample is at a temperature of between 450 and 600° C.

Thirty passes of the burner above the sample are carried out.

The thickness of the layer deposited is between 200 and 600 nm.

The coated sample is blue in transmission and in reflection.

EXAMPLE 2

A 500 ml solution in ethanol of the following oxide precursors is prepared:
Tetraethoxysilane
Triethoxyborane
Sodium nitrate
Lithium ethoxide and
Cobalt acetylacetonate.

The amounts are such that the blue glass of the layer which is formed by flame pyrolysis comprises, as % by weight:

| | |
|---|---|
| SiO₂ | 56 (%) |
| B₂O₃ | 12 |
| Na₂O | 28 |
| LiO | 2 |
| CoO | 2 |

The conditions of example 1 are reproduced but with a flow rate of the solution of precursors of 1 ml/min.

The distance from the burner to the glass sample is 4 mm.

The sample is at a temperature of between 500 and 600° C.

Twelve passes of the burner above the sample are carried out here.

The thickness of the layer deposited is between 50 and 150 nm.

The coated sample is blue in transmission and in reflection.

EXAMPLE 3

Example 2 is reproduced, additionally using calcium methoxyethoxide as CaO precursor.

The composition of the blue glass layer formed by flame pyrolysis is, as % by weight:

| | |
|---|---|
| SiO₂ | 74 (%) |
| Na₂O | 14 |
| CaO | 10.2 |
| CoO | 1.8 |

The operating conditions and the observations with regard to the product obtained are the same as in example 2.

In the three examples, the layer formed is dense, as may be observed with a scanning electron microscope.

The invention claimed is:

1. A process comprising depositing a colored glass layer on a surface of a glass substrate by flame pyrolysis of a solution comprising at least one first precursor of a cobalt, iron, manganese, chromium, silver, copper, gold or selenium oxide, alone or as a mixture of several of them, said solution further comprising a second precursor of $SiO_2$ and at least one third precursor selected from the group consisting of $B_2O_3$, $Na_2O$, LiO, CaO and any combination thereof, wherein the depositing includes
introducing said solution including the first, second and third precursors into a burner and then decomposing the first, second and third precursors in solution in the burner to form silicate glass nanoparticles including $SiO_2$ and at least one material selected from the group consisting of $B_2O_3$, $Na_2O$, LiO, CaO and any combination thereof and then depositing the silicate glass nanoparticles on said glass substrate at a temperature between ambient temperature and 500° C. to form the colored glass layer on the surface of the glass substrate, said colored glass layer consisting of said glass nanoparticles.

2. The process as claimed in claim 1, wherein said first precursors consist of organometallic compounds and/or salts.

3. The process as claimed in claim 1, wherein said first precursors are soluble in alcoholic solution.

4. The process as claimed in claim 1, wherein a distance from the burner to the glass substrate is at most equal to 10 mm.

5. A glass substrate coated with a layer of colored glass obtained by a process as claimed in claim 1, wherein a thickness of the layer of colored glass is between 50 and 10 000 nm.

6. The process as claimed in claim 1, wherein the solution including the first, second and third precursors introduced into the burner includes tetraethoxysilane (TEOS), aluminum tri(sec-butoxide), triethoxyborane, magnesium methoxyethoxide, calcium methoxyethoxide, potassium t-butoxide and cobalt acetyl acetonate.

7. The process as claimed in claim 1, wherein the solution including the first, second and third precursors introduced into the burner includes tetraethoxysilane (TEOS), triethoxyborane, sodium nitrate, lithium ethoxide and cobalt acetylacetonate.

8. The process as claimed in claim 1, wherein the solution including the first, second and third precursors introduced into the burner includes tetraethoxysilane (TEOS), triethoxyborane, sodium nitrate, lithium ethoxide, cobalt acetylacetonate and calcium methoxyethoxide.

* * * * *